Patented Oct. 4, 1932

1,880,470

UNITED STATES PATENT OFFICE

BEVERLY OBER AND EDWARD HYATT WIGHT, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

PROCESS FOR THE PRODUCTION OF PHOSPHATIC FERTILIZERS

No Drawing.     Application filed September 20, 1929.  Serial No. 394,131.

This invention relates to the production of phosphatic fertilizers and is a continuation in part of applications Serial No. 105,566 filed April 29, 1926, and Serial No. 305,789, filed September 8, 1928.

In the usual method of manufacturing phosphate fertilizers it is the practice to admit definite quantities of sulphuric or phosphoric acid and ground phosphate rock to a mixing device. In the mixer the acid and rock are agitated so as to mutually disperse the ingredients. This mixing operation, particularly in the case of superphosphates, is of short duration and necessarily incomplete because of the fact that the acid and rock quickly react to form solid products. The presence of the solid reaction products causes the mass to take on a semi-solid state known as "set-up". Before the mass is thus "set-up" the contents of the mixture are delivered to the den where the material is allowed to remain for a period of twenty-four hours more or less. From the den the material is transported to a curing shed where it is aerated and dried.

Due to the fact that the mixing operation is incomplete, a thorough incorporation of rock and acid is difficult, if not impossible, to obtain and as a result the conversion of the unavailable phosphate is prolonged.

In the copending application referred to above there is described a method of manufacturing phosphate fertilizers which includes the admission of regulated quantities of finely divided phosphatic material into a stream of a reagent so as to secure simultaneous charging and mixing. This is accomplished by impinging flowing streams of acid and dust in the compounding zone of predetermined and constant ratios and then discharging the compounded mass to a receiving stage, such as an autoclave, wherein the mass is digested or converted. After the conversion of the unavailable phosphate material to an available form, the conditions in the autoclave are controlled to effect crystallization and drying of the mass.

It has been found that by an intimate correlation of the factors influencing the activity of the reactions, a decided improvement in the process may be secured. In carrying out the present process streams of acid and dust are delivered respectively from an acid tank and dust hopper to a charging valve such as described in the copending application referred to, or in copending application Serial No. 394,130, filed Sept. 20, 1929. Preferably the acid charging tank, or the tank from which the charging tank is filled is provided with a temperature controlling means so as to govern the temperature of the acid. The dust hopper and the acid tank are preferably connected to an air compressor and a positive pressure placed on the two ingredients to insure a rapid flow. Prior to charging the autoclave the latter is sealed off from the acid and dust line by means of a suitable valve or valves and a partial vacuum set up therein. This vacuum may be of any desired value. The vacuum "set-up" assists the flow of materials as explained fully in application Ser. No. 304,789. In addition to this function, the vacuum serves to largely eliminate back pressure, to increase the turbulence and hence enhance the mix and increase the contact of the reactive agents. Furthermore this has an additional beneficial function in that it increases the density and withdraws some of the gasses and vapors from the mix.

This vacuum may be attained by means of a vacuum pump or any other suitable suction means such as a jet, fan or blower in combination, if desired, with a suitable absorption and recovery system.

The speed of flow of the compounded sludge and the mixing thereof may be further increased by subjecting the stream to the action of a suitable jet of air, carbon dioxide, ammonia or any other reactive gasses.

When the vacuum has been attained in the autoclave, the valves in the discharge lines from the acid tank and the hopper are opened to permit a flow of the two materials into the charging device. In this device the two ingredients are compounded and then discharged to the autoclave. During the charging step the vacuum pump or equivalent means connected to the autoclave is continued in operation so as to minimize any back pressure on the charge.

It has been found that the time in which the autoclave or other receiving stage is charged must be very carefully regulated to obtain optimum acidulation and a minimum adhesion of the mass. There is a definite relationship between the activity of the mass and the time in which it must be charged. For example it is found that, as a general proposition, as the activity of the reaction mass is increased the time during which it is charged must be correspondingly decreased. This is believed to be due largely to the fact that in order to obtain optimum results the components of the reaction must be retained either in solution or readily available until time for crystallization as explained in application Ser. No. 105,566.

This critical condition appears to be particularly true of the water content. In manufacturing acid phosphate the water employed serves many purposes. Among these, it serves as a diluent for the acid; and provides available water for water of crystallization or constitution for the reaction products.

If acid and rock are allowed to react, and particularly under accelerating conditions, a vigorous action results. The reaction is exothermic and the temperatures rise very rapidly above the boiling point of water. In addition, certain of the products of reaction are gaseous and, if permitted, will rapidly escape from the material. In these circumstances, the large loss of water results, due to volatilization and to entrainment of liquid water in the escaping gas. This escape of water not only diminishes the fluidity of the mass and thus renders it less mixable, but it also may withdraw some of the water required for water of crystallization.

In the present operation the necessity of regulating the time of charging in respect to the activity of the mass is believed to be due in part to the critical effect of water. In addition to the value of water as a diluent and as providing water of crystallization for the components it serves additional beneficial functions. The water acts to accelerate reactions by its solvent effect. Furthermore during the earlier stages of the conversion the retained water tends to maintain the mass in a mixable or plastic condition which as will be appreciated permits an easy kneading or working of the mass. By rotating the autoclave or otherwise agitating or working the material, it is constantly densified and resurfaced with the desirable expulsion of occluded gases. As a result the interacting substances are brought into more intimate contact with a consequently high utilization of the acidulating medium which achieves high acid economy.

This critical effect of the retention of the components and particularly of the water content is more readily seen when the conditions are so adjusted as to permit their escape.

One of the major factors which prolonged the old method of manufacturing acid phosphate was the rapidity of the reaction during the initial steps of contact of the materials. In the ordinary mixing pan the relatively strong acid reacts immediately with the rock and within a period of but a few minutes the solid reaction products are formed. This formation of solid products is accompanied by the generation of exothermic heats, which are immediately dispelled and the evolution of gases and vapors. In a very short period the mass passes from a fluent to a substantially solid condition, precluding further mixing and reducing the points of contact between the acid ingredients and the unattacked phosphate rock.

Furthermore, in a continuation of the old processes these two materials, namely the acid and unattacked rock, are not again brought together under favorable conditions for further action. Even though the mass be evacuated from the den and the porosity be broken down, the exothermic heats have been lost and the reaction proceeds very slowly. Even though the mass be milled and stored in piles there is insufficient moisture present and insufficient temperature to accelerate the reaction of the acid with the rock.

In the present process, as noted above, it has been found that when the conditions are so adjusted as to increase the activity of the mass and the time of charging is maintained the same, a relatively inferior product is produced. This conceivably is due to the same causes as obtain in the old den process, that is to say the acceleration of the reactions cause a vigorous evolution of the volatile components which were withdrawn in part from the mass during the charging period. At any rate, it has been found that the converse is true, namely that in order to obtain a desirable product the time of charging must be diminished as the activity is increased.

The conditions which increase the activity in the present process are relatively numerous and closely correlated. For example the chemical reactions may be accelerated by heating the raw material, that is to say either the acid or dust or both; heating the reaction zone; largely retaining the exothermic heats of reaction; increasing the fineness of the dust and increasing the strength of the acid. Other things being equal, it is of course desirable to accelerate the reactions as far as is commensurate with an improved product.

The major purpose of the present invention is to provide a process in which the reactions are highly accelerated to obtain an improved product and with substantial acid economies.

It has been found that by charging with dust of such fineness that 90% passes through an eighty mesh screen, compounding this with 52° Bé. acid preheated to 90° F., a five ton mass must be charged to the autoclave in less than three minutes. If the same type of dust is employed but 54° Bé. acid at 90° F. used for the acidulating agent, the charging must be done in less than one minute and twenty seconds to obtain the improved product. Again if this same type of dust is compounded with 56° Bé. acid at 90° F., the mass must be charged to the autoclave in less than fifty-four seconds to obtain the improved product.

It has been found also that this critical relationship between activity and time of charge is not limited to any one accelerating factor such as the strength of the acid. In the preceding examples, that is to say charging with dust of a fineness so that 90% passes through an eighty mesh screen and 52, 54 or 56° Bé. acid, the time of charging must be reduced as the temperature of the acid increases. Furthermore if, under given conditions of acid concentration and temperature, the fineness of the dust is increased, the time of charge must be proportionately reduced.

In order to show the effect of variations in certain factors in the reaction necessary to compensate for variations in other factors, the results of several test runs have been tabulated in the following tables.

In Table I, the fineness of dust, acid concentration and the quantity charged, is maintained constant, and the temperature of the acid is varied. It will be seen from this table that as the reactions are accelerated by increasing temperature of the acid, the time in which a given mass is charged to the autoclave must be correspondingly diminished in order to prevent sticking and to otherwise insure efficient operation.

Table I

| Fineness of dust | Acid temperature | Acid concentrate | Quantity of material charged | Time of charge |
|---|---|---|---|---|
| | | | Tons | |
| 90% thru 80 mesh screen | 90 | 52 | 5 | Less than 3 min. |
| 90% thru 80 mesh screen | 110 | 52 | 5 | Less than 2 min. |
| 90% thru 80 mesh screen | 125 | 52 | 5 | Less than 1 min.—¼ min. |

In Table II, the acid temperature, acid concentrate and tonnage is maintained constant but the fineness of the dust is increased. It will be noted that here also the time in which a given quantity is charged to the autoclave must be diminished as the fineness of the dust is increased.

Table II

| Fineness of dust | Acid temperature | Acid concentrate | Quantity of material charged | Time of charge |
|---|---|---|---|---|
| | | | Tons | |
| 90% thru 80 mesh screen | 90 | 52 | 5 | Less than 3 min. |
| 90% thru 90 mesh screen | 90 | 52 | 5 | Less than 2 min. |
| 90% thru 100 mesh screen | 90 | 52 | 5 | Less than 1¼ min. |

It will be noted from the data in this table and from that given hereinbefore that the time of charging is an important factor and must be carefully regulated with respect to the other conditions in order to obtain the optimum results.

In one preferred operation the combined mixture of acid and dust is charged to the reaction zone. This may comprise the rotary autoclave heated externaly under twenty lbs. steam pressure. Due to the fact that the combined mixture is charged to a heated reaction zone, further accelerating conditions are introduced and the retention of the components of the mass becomes of increasing importance.

It has been found that after the material has been charged, in the manner and under the conditions described, it is desirable to control the pressures in the reaction zone and more particularly during the early stages of reaction. While proposing no exact theory of the mechanism of the reactions involved in the conversion step, it appears that pressures are advantageous because of the critical effect of water and/or other components of the mass, as explained hereinbefore. By imposing pressure on the materials in the autoclave, the reactivity of the mass is retarded, in the manner fully explained in application Serial No. 171,706, filed March 30, 1927. This retardation of reactivity tends to prevent the formation of the solid end products. This prevention of the formation of solid end products tends to maintain the mass in a fluent or mixable condition for a longer period of time and by checking the evolution of water gives a better physical mixing, and minimizes adherence of the mass to the shell. Incrustations of the shell hinders the control obtained by applied heat. The retention of pressures, therefore, conceivably may be interpreted as a time element which allows the solid particles to be thoroughly wetted with the acid. This complete wetting or dispersion of the acid through the rock is further increased or accentuated by rotating the autoclave. The maintenance of pressure by means of checking the formation of gases and rotation of the autoclave, gives a denser mass than could be obtained when acid and rock are mixed and allowed to react as a stationary mass. The close contact of the acid and rock, insured by the retention of the components in the manner explained above, is maintained during the digestion period and even after the initial release of pressures.

In the preferred process substantially the initial pressures are maintained during the early stages of digestion and preferably for about ten minutes. Thereafter, the pressure may be relieved at regular intervals. This regular release of pressure has a decided beneficial effect upon the product. This would seem to be due to the fact that upon the release of pressures, a flow of gas takes place from the mass which effects a certain amount of additional agitation, rearrangement of particles and exposure of new surfaces. It is believed therefore, that the intermittent release of pressure with its concomitant evolution of gas, without the elimination of appreciable quantities of water, effects further contact between the acid and rock which is commercially impracticable in the den process.

If desired, the initial pressures may be reduced and maintained at any desired pressure for any predetermined time prior to the crystallization and drying. In addition to the benefits noted, the release of pressure subsequently to the initial pressure serves to further increase the agitation and contact of acidifying solutions or agents prior to crystallization. It will be understood that the reactivity of the mass may be controlled not only through the medium of imposed pressure, but also by control of temperature. If desired, the exo-thermic heats may be abstracted and a retarding effect imposed by pre-cooling. Manifestly, in lieu of using autogenous pressure, we may employ the pressure of inert, active or catalytic gases, introduced on an extraneous source.

After the mass has been digested in the manner described, the pressure may be reduced to atmospheric. This reduction of pressure and the evolution of gas effects a reduction in the temperature of the mass which initiates crystallization. As explained in prior application 166,808, filed February 8, 1927, the crystallization may be further accelerated by positively cooling the mass. It will be noted that here again the reduction of pressures during the digestion period has a positive beneficial action on subsequent steps. By maintaining sufficient available water for water of crystallization, this step, namely the crystallization of the crystallizable products, is rendered more complete.

It will be observed that by properly regulating the quantity of water present at the end of the digestion period, the mass may be substantially completely crystallized with practically complete elimination of excess or free moisture, and thereby substantially eliminate this drying period.

After the mass has been crystallized, the conditions within the autoclave may be adjusted to dry the mass. This drying step may comprise heating the material to raise the temperature of the mass to increase the tendency of excess water to volatilize, supplemented by reduced pressure to cause evolution of water vapor at a lower temperature. In the preferred treatment, however, the mass at this point is vacuum cured in the manner described more particularly in the copending application of Anderson, Serial No. 393,853 filed Sept. 19, 1929. This treatment comprises vacuumizing the mass under applied external heat properly controlled. It will be evident that by retaining the exothermic heats of reaction and/or those applied during digestion, there will be considerable residual or sensible heat in the mass which is available to assist in volatilizing the contained water.

It will now be appreciated that there is provided a decidedly improved process of manufacturing said phosphate. As compared to the older den method in which approximately three months was required to produce a product of desirable acidulation and dryness, it is possible by the present method to produce a dry, highly acidulated product in approximately two hours. Furthermore, due to the complete utilization of the acid and the control of the components, it is possible to operate the autoclave on two thousand tons without cleaning incrustations. Furthermore, it will be appreciated that the process is admirably suited to manufacturing conditions by reason of the relatively simple apparatus employed and the minimal space requirements. This apparatus not only eliminates the necessity for a large den, but also eliminates the necessity of a curing pile as a necessary element in manufacturing phosphatic fertilizers.

In all of the foregoing reactions, the proportions of the acidulating agent and the phosphatic rock dust may be varied within certain limits. For instance, it has been found that the dust to acid ratio may be varied from 100/80 to 100/93. Of course, other ratios may be employed as desirable, depending upon the particular type of rock dust employed.

While the process has been described with particular relation to superphosphates, it obviously is equally applicable for the production of double superphosphates by acidulating rock dust with phosphoric acid. If desired, the acidulating agent may comprise a mixture of sulphuric acid and phosphoric acid, or any other desired acidulating agent.

We claim:

1. A process of preparing phosphatic fertilizers comprising instituting streams of acid and finely divided phosphatic material, mutually impinging the streams, charging the mixed stream to a receiving stage and varying the concentration of the acid stream inversely with the time of charging to minimize the loss of volatile material in transit and to maintain the mass in a mixable condition.

2. A process of preparing phosphatic fertilizer comprising instituting separate streams of finely divided phosphatic material and acid, impinging the streams in a compounding stage, passing the mixed stream to a reaction stage wherein the mixture is maintained in an unset condition until completion of the reaction and varying the speed of flow directly with variations in the reactivity of the acid and dust to maintain a predetermined viscosity of the mixture.

3. A process of preparing phosphatic fertilizer comprising mixing heated acid and finely divided rock dust in a compounding stage, passing the mixture to a confined receiving stage and varying the speed of flow of the mixture directly with the temperature of the acid so as to maintain a predetermined viscosity of the mixture.

4. A process of preparing phosphatic fertilizer comprising mixing acid and finely divided phosphatic material in a compounding stage, passing the mixture to a confined receiving stage and varying the speed of flow of the mixture directly with the degree of fineness so as to maintain the mixture at a predetermined viscosity.

5. A process of preparing phosphatic fertilizer comprising mixing acid and finely divided phosphatic material in a compounding stage, passing the mixture to a receiving stage and varying the speed of flow of the mixture directly with the temperature of the phosphatic material so as to maintain a predetermined viscosity of the mixture.

6. A process of preparing phosphatic fertilizer comprising mixing ground phosphatic material and an acid in a compounding stage, passing the mixture to a confined zone, maintaining the mixture in an unset condition in said zone and diminishing the time of flow of the mixture into the zone as the potential reactivity of the mixture is increased to prevent setting of the mixture during charging.

7. A method of preparing phosphatic fertilizer comprising mixing ground phosphatic material and an acid in a compounding stage, charging the mixture to a reaction zone, maintaining the mixture in an unset condition in the reaction zone and decreasing the time of charging of the mixture into the zone as the concentration of the acid is increased to maintain the mixture at a predetermined viscosity.

8. A method of preparing phosphatic fertilizer comprising mixing ground phosphatic material and an acid in a compounding stage, charging the mixture to a reaction zone, maintaining the mixture in an unset condition in the reaction zone and decreasing the time of charging of the mixture into the zone as the fineness of the ground phosphatic material is increased to maintain the mixture at a predetermined viscosity.

9. A method of preparing phosphatic fertilizer comprising mixing ground phosphatic material and an acid in a compounding stage, charging the mixture to a reaction zone, and decreasing the time of charging of the mixture into the zone as the temperature of the mass is increased.

10. A method of preparing phosphatic fertilizer comprising mixing ground phosphatic material and an acid in a compounding stage, charging the mixture to a reaction zone, maintaining the mixture in an unset condition in the reaction zone and decreasing the time of charging of the mixture into the zone as the temperature and concentration of the acid is increased to maintain the mixture at a predetermined viscosity.

11. A method of preparing phosphatic fertilizer comprising mixing ground phosphatic material and an acid in a compounding stage, charging the mixture to a reaction zone, maintaining the mixture in an unset condition in the reaction zone and decreasing the time of charging of the mixture into the zone as the temperature, concentration of the acid, and fineness of the phosphatic material is increased to maintain the mixture at a predetermined viscosity.

In testimony whereof we affix our signatures.

BEVERLY OBER.
EDWARD HYATT WIGHT.